United States Patent [19]

Morris et al.

[11] Patent Number: 5,792,411
[45] Date of Patent: Aug. 11, 1998

[54] LASER MACHINED REPLICATION TOOLING

[75] Inventors: Terry L. Morris, Eagan; Herbert J. Fox, Maplewood; Thomas P. Hanschen, St. Paul; Philip Miller, Eagan, all of Minn.

[73] Assignee: Minnesota Mining and Manufacturing Company, St. Paul, Minn.

[21] Appl. No.: 535,608

[22] Filed: Sep. 28, 1995

Related U.S. Application Data

[63] Continuation of Ser. No. 76,316, Jun. 11, 1993, abandoned.

[51] Int. Cl.$^6$ ................................................. B28B 7/20
[52] U.S. Cl. .................. 264/400; 219/121.69; 264/482; 264/219; 425/174.4
[58] Field of Search ........................ 264/219, 220, 264/400, 482, 167, 210.1, 210.2; 219/121.67, 121.68, 121.69; 425/174.4, 175

[56] References Cited

U.S. PATENT DOCUMENTS

| | | |
|---|---|---|
| 3,235,438 | 2/1966 | Wisotzky . |
| 3,422,246 | 1/1969 | Wetzel . |
| 3,594,865 | 7/1971 | Erb et al. . |
| 3,634,646 | 1/1972 | Berger . |
| 4,032,743 | 6/1977 | Erbach et al. . |
| 4,044,222 | 8/1977 | Kestenbaum . |
| 4,080,634 | 3/1978 | Schreiber . |
| 4,092,515 | 5/1978 | Joslin et al. . |
| 4,110,796 | 8/1978 | Aughton . |
| 4,169,303 | 10/1979 | Lemelson . |
| 4,240,119 | 12/1980 | Norton et al. . |
| 4,262,186 | 4/1981 | Provancher . |
| 4,290,248 | 9/1981 | Kemerer et al. . |
| 4,297,559 | 10/1981 | Whitman, III . |
| 4,402,571 | 9/1983 | Cowan et al. . |
| 4,499,040 | 2/1985 | Maemoto et al. ................. 264/167 |
| 4,568,815 | 2/1986 | Kimbara et al. . |
| 4,633,058 | 12/1986 | Jones . |
| 4,668,558 | 5/1987 | Barber ............................... 264/22 |
| 4,734,558 | 3/1988 | Nakano et al. . |
| 4,832,966 | 5/1989 | Newsteder ........................ 264/219 |
| 4,925,381 | 5/1990 | Aoki et al. ........................ 264/40.7 |
| 4,938,563 | 7/1990 | Nelson et al. . |
| 4,954,065 | 9/1990 | Shindo et al. ..................... 425/175 |
| 4,959,265 | 9/1990 | Wood et al. . |
| 4,999,067 | 3/1991 | Erb et al. . |
| 5,077,870 | 1/1992 | Melbye et al. . |
| 5,269,983 | 12/1993 | Schulz . |
| 5,302,421 | 4/1994 | Hoessel et al. .................... 264/219 |
| 5,393,475 | 2/1995 | Murasaki et al. ................. 264/167 |
| 5,441,687 | 8/1995 | Murasaki et al. ................. 264/167 |
| 5,460,757 | 10/1995 | Hedgecoth ......................... 264/482 |

FOREIGN PATENT DOCUMENTS

| | | |
|---|---|---|
| 0 327 398 | 8/1989 | European Pat. Off. . |
| 0 432 958 A1 | 6/1991 | European Pat. Off. . |
| 2 040 140 | 4/1972 | Germany . |
| 27 19 275 A1 | 11/1977 | Germany . |
| 3620791 A1 | 6/1986 | Germany . |
| 6-48097 | 2/1994 | Japan .................................. 264/400 |
| 2 190 028 | 11/1987 | United Kingdom . |

OTHER PUBLICATIONS

Jaques, Michel and Fietz, Ralf. "Removal of material on any surface using laser machining Lasercav" presented at a Congress in Belfort, France on 24–26 Mar. 1992. (English translation provided).

Erhfeld, W. et al., "Progress in deep–etch synchrotron radiation lithography." *J. Vac. Sci. Technol.* B 6 (1), Jan./Feb. 1988, pp. 178–182.

Srinivasan, R. et al., "Ultraviolet Laser Ablation of Organic Polymers," *Chem. Rev.*, vol. 89, No. 6, 1989, pp. 1303–1316.

*Primary Examiner*—Mathieu D. Vargot
*Attorney, Agent, or Firm*—Robert H. Jordan

[57] ABSTRACT

The invention relates to a method of manufacturing a replication master tooling article suitable for manufacturing replicated articles by machining a substrate surface with laser energy to produce a plurality of geometric structures in the substrate, the geometric structures having side surfaces extending from the surface of the substrate into the substrate.

19 Claims, 3 Drawing Sheets ns
5,792,411

1
LASER MACHINED REPLICATION TOOLING

This is a continuation of application Ser. No. 08/076,316 filed Jun. 11, 1993, now abandoned.

FIELD OF THE INVENTION

The invention relates to replication tooling. In particular, the invention relates to laser machined replication tooling useful for production of structured articles.

BACKGROUND OF THE INVENTION

Replication tooling has been produced by several different techniques. These techniques include, for instance, machining and chemical processing. Machining is accomplished by cutting with a stylus or microdrilling into a substrate. Devices which accomplish such machining are either manually, mechanically or electronically controlled. These devices are capable of producing surfaces with optical grade precision, depending upon their quality. U.S. Pat. No. 4,938,563 to Nelson et al. discloses the use of a diamond stylus for cutting into a flat metal surface of a master tool or mold. U.S. Pat. No. 4,959,265 to Wood et al. discloses the use of a microdrill to form the mold for a pressure-sensitive adhesive tape fastener backing. U.S. Pat. No. 5,077,870 to Melbye et al. relates to the use of a microdrill to form a metal mold used to produce mushroom-type hook strips for a mechanical fastener. These methods are considered slow for all but the simplest replications. In addition, replacement of the stylus and drill bits is expensive and adds to the cost of the machining.

Another method for the production of microstructured tooling relates to the use of sharpened or shaped structures, such as pins or rods, being forced into a relatively soft medium, such as described in U.S. Pat. No. 3,235,438 to Wisotzky. U.S. Pat. No. 3,235,438 also illustrates the traditional, multi-step approach to the production of a microreplication molding or tooling. A primary negative mold is prepared by forcing the structures into the relatively soft medium. Intermediate positive master molds are made from the negative primary mold and are then joined together to form a large positive mold. A large negative mold is then produced from the large positive mold, which is then used to produce replicated articles. Preparation of the final negative mold requires significant time and cost.

Some microreplication applications require optical quality surfaces, which necessitates the use of costly production devices. However, there is a growing number of applications which do not require optical quality tooling since a precisely manufactured article surface is not required.

Lasers have been used to machine some finished articles, such as filters, award plaques, rubber stamps, and stencils, but lasers have not been used to make molds or replication toolings.

SUMMARY OF THE INVENTION

The invention relates to a method of manufacturing a microreplication master tooling suitable for manufacturing replicated articles by machining a substrate surface with a laser light source to produce at least one geometric structure having side surfaces extending from the substrate surface into the substrate.

The invention also relates to a method of manufacturing a microreplication master tooling suitable for manufacturing replicated articles by machining a flexible, unitary substrate surface to produce at least one geometric structure having side surfaces extending into the substrate, such that the substrate provides structural means for producing articles replicated from the master tooling.

The invention further relates to a method of manufacturing a microreplication master tooling suitable for manufacturing replicated articles by machining a flexible substrate surface with a laser light source to produce a plurality of geometric structures having side surfaces extending from the substrate surface into the substrate.

The invention also relates to a method of manufacturing an article from a microreplication master tooling by machining a flexible tooling substrate with a laser light source to produce at least one geometric structure in the flexible substrate. A moldable material is then applied to the substrate surface and the at least one geometric structure. The moldable material is solidified to produce a replicated article of the tooling, and the replicated article is removed from the tooling.

The invention further relates to an article that is manufactured by the method. In addition, the invention relates to an article replicated from the article which was manufactured.

The invention relates to an article which may be used as a replication master tooling suitable for replicating microstructured arrays which includes a flexible substrate having a plurality of geometric structures extending into the substrate which were formed by a laser light source.

DETAILED DESCRIPTION OF THE INVENTION

Figures 1, 2, 3, 4:
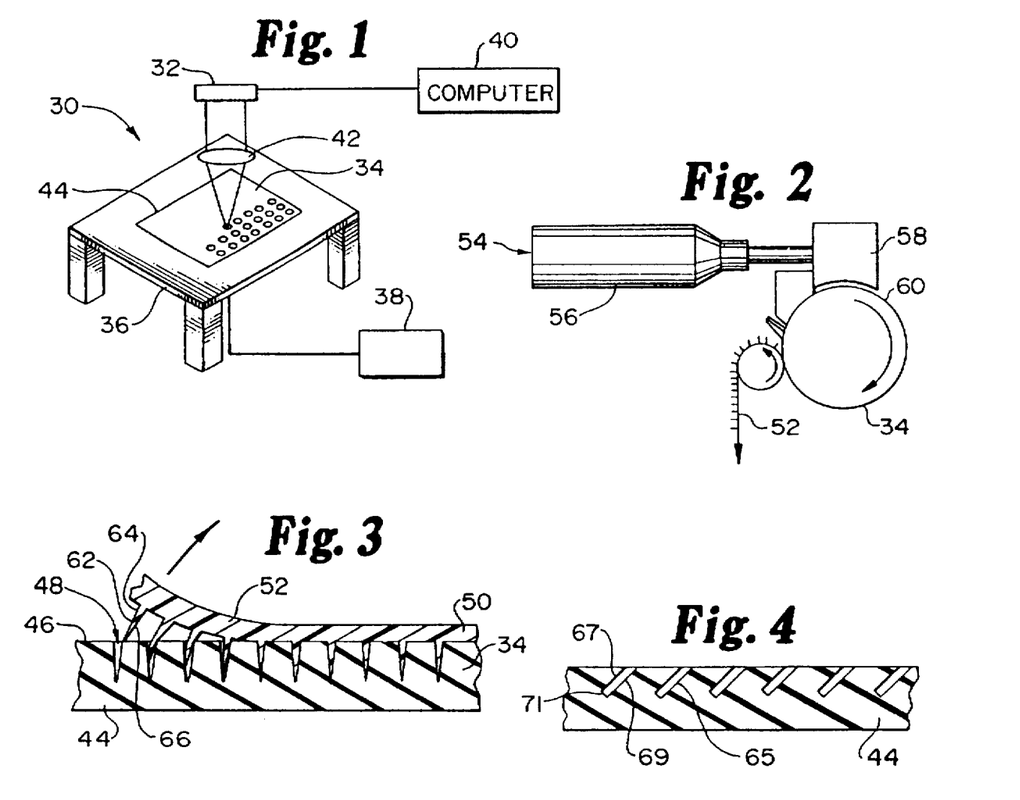
FIG. 1 is a perspective schematic view of a microreplication tooling manufacturing system.
FIG. 2 is a diagram of a method of extruding the moldable material onto a master microreplication tooling manufactured by the system of FIG. 1.
FIG. 3 is a cross section view of the master microreplication tooling manufactured by the system in FIG. 1, showing a partially removed moldable material which was applied to the surface of the tooling to produce a replicated article of the tooling.
FIG. 4 is a cross section view of a microreplication master tooling manufactured by the system of FIG. 1 where the geometric configuration is an angled tubular structure.

The invention relates to replication tooling articles which are used to replicate non-optical quality structured surfaces. The replication toolings of the invention may be used in both micro and macro applications. It should be understood that any reference to microreplication master toolings throughout this application may be interchanged with macroreplication master toolings. FIG. 1 illustrates microreplication master tooling manufacturing system 30. Microreplication tooling system 30 generally comprises a laser light source 32 and a substrate 34 positioned on a preferably movable surface, such as a table 36 or other suitable support structure. Table 36 may be moved in a five axis orientation, X,Y,Z and rotations, by a control means 38, such as a computer, to position substrate 34 in different positions and locations under laser light source 32. Alternatively, the laser beam from laser light source 32 can also be moved in a five axis orientation. The motion of table 36 under laser light source 32 produces different geometric configurations within substrate 34.

Laser light source 32 may be any type of laser that interacts well with substrate 34. A carbon dioxide ($CO_2$) laser is preferred since $CO_2$ lasers couple successfully with a multitude of substrates, and are low in cost. Preferably, a 10 watt to 1000 watt $CO_2$ laser, more preferably, a 50–300 watt $CO_2$ laser, is utilized. However, other lasers or high energy sources which will couple with the substrate material, such as an excimer laser, may be utilized. Parameters such as pulse spacing, power level, pulse length, mode, wavelength, cavity pressure, feed rate, gas mixture, choice of lens, and standoff distance, or focus, of laser light source 32 may be varied depending on the effect or design desired in substrate 34. Laser light or energy from laser light source 32 rapidly and efficiently machines, i.e., cuts or drills, cavities into substrate 34 at varying depths suitable for the desired end use of master replication mold or tooling 44.

Laser light source 32 may be manually, electronically, or automatically controlled by control means 40, such as a computer. Control means 40 may be the same control means used to move table 36, or may be a separate means. The unfocused laser light may be passed through focusing means 42 in laser light source 32 to substrate 34. Focusing means 42 of laser light source 32 controls or shapes the emitted laser energy toward substrate 34. Focusing means 42 preferably accommodates varying focal lengths of the laser light. For example, a 1.5 inch (3.81 cm) asphere lens may be utilized.

Substrate 34 is utilized as the microreplication master mold or tooling article 44 for creating replicated articles comprising microstructured arrays or surfaces. Substrate 34 preferably comprises any suitable material which can withstand varying temperatures, pressures, solvents, chemicals, exposure to melt based delivery of materials, and exposure to radiation during curing involved in the manufacture of the article produced using master tooling 44. In addition, master tooling substrate 34 is preferably durable, deformable, has good release capabilities, can satisfactorily receive laser light from laser light source 32, and may be flexible. Preferred substrates 34 comprising master tooling 44 are rubber materials which are thermally stable over time, and more preferably, comprise thermoset materials which have been cross-linked. Most preferred substrates are polysiloxane (silicone) rubbers of different grades conforming to ASTM D-2000 Classification FC, FE, GE, such as are available from General Electric Corporation.

Other materials may also be utilized for substrate 34 for master tooling 44, including deformable and flexible materials such as products marketed under the tradename TEFLON by E. I. DuPont de Nemours & Co., natural rubber, fluoro-elastomers, and thermoplastics; and materials such as wood, ceramics, glass and different metals including steel, copper, lead, aluminum, and the like. These substrate materials may be coated with or have incorporated within a release agent to aid in the removal of the replicated articles. Laser energy has been found to interact with these substrates. Although the resulting geometric structures which result from the machining of these substrates may not be as well defined as the geometric structures in the silicone rubber substrate, the structures may be acceptable for many non-optical quality applications. In addition, the removal of substrate material from tooling 44 made of these materials may not be as readily and completely accomplished as from a silicone rubber substrate.

Substrate 34 may be of varying shapes and sizes, depending on the desired use of microreplication master tooling 44. For instance, substrate 34 may comprise a substantially planar plate, as shown in FIG. 1, or may be wrapped around a drum or cylinder, as shown in FIG. 2. Preferably, microreplication master tooling 44 is an integral, single piece substrate 34 which does not need to be pieced together prior to use as a replication master mold. Also, microreplication master tooling 44 may comprise a single layered substrate 34 or a multi-layered substrate 34 comprising one material or a combination of materials in the layers. The surface 46 of substrate 34 may be planar or non-planar, including undulating and pre-grooved surfaces, and is substantially continuous. The non-planar surfaces may also have been laser machined with larger, macro features easily discernible to the naked eye. Preferably, surface 46 of substrate 34 is substantially planar.

Referring to FIG. 1. laser light from laser light source 32 is used to machine substrate 34 to produce microreplication master tooling 44. Additional machining or etching steps may also be done on master tooling 44. Referring to FIG. 3, surface 46 of substrate 34 is machined by laser light source 32 to produce wall portions defining one or more cavities 48 recessed from substantially continuous surface 46. Cavities 48 include various geometric structures having side surfaces which extend from surface 46 into substrate 34. Laser light may contact substrate 34 once to produce one or more cavities 48, or may strike the same cavity 48 multiple times to produce a variety of geometric shapes. The geometric structures may be canted at different angles relative to surface 46 of tooling 44, depending on the relative positions of the laser beam and surface 46 of substrate 34. In addition, the laser beam may be split to produce varying geometric shapes in substrate 34 and/or redirected to intersect substrate 34 at different angles relative to substrate 34. Alternatively, the laser light may be masked to control the energy profile reaching the substrate. Laser light may be used to machine cavities 48 in substrate 34, or may machine all the way through substrate 34. The ability to move substrate 34 under laser light and select or program laser light source 32 for different variables produces varied high feature density patterns, grids, logos, designs and the like within substrate 34.

Figures 23, 25, 26, 27, 28, 29, 30:
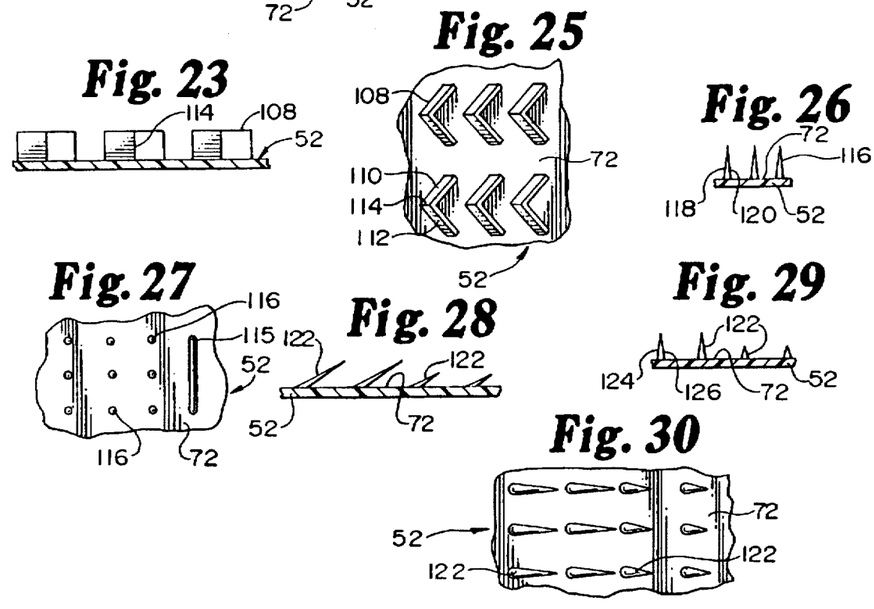
FIG. 23 is a front section view of the article produced from a microreplication tooling in which the chevron geometric structures have a substantially perpendicular configuration.
FIG. 25 is a top view of the replicated article of FIGS. 23 and 24.
FIG. 26 is a side section view of the replicated article produced from a microreplication tooling in which the geometric structure is a single protrusion.
FIG. 27 is a top view of the replicated article of FIG. 26.
FIG. 28 is a front section view of an article produced from a microreplication tooling in which the geometric structures are angled protrusions at differing heights.
FIG. 29 is a side section view of a replicated article shown in FIG. 28.
FIG. 30 is a top view of the replicated article of FIGS. 28 and 29.

In general, the geometric structures produced in master tooling 44 may be uniform in height, as illustrated in FIG. 26, or may be of multiple differing heights, as shown in FIG. 28, depending on the desired end use of articles produced by tooling 44. Diameters of the geometric structures adjacent surface 46 of substrate 34 and the thicknesses between the geometric structure outer and inner surfaces (i.e., measured in a direction parallel to the axis of the protrusions) also vary, but are of such dimensions suitable for the desired use of tooling 44. Further, the density of the geometric structures in substrate 34 may vary depending on the use of replicated articles produced by tooling 44. Microreplication master tooling manufacturing system 30 is particularly advantageous for manufacturing high feature density toolings 44 at a fast rate which have a large number of detailed or shaped geometric structures per given area.

Referring to FIG. 3, a moldable material 50 is applied to a first surface 46 of microreplication master tooling 44 by, for example, extrusion or cast molding to create a replicate or article 52 of the microstructured surfaces 46 of microreplication tooling 44. In preferred embodiments, the adhesion of material 50 to tooling 44 is less than the cohesion at the time of removal of material 50 from the tooling.

Referring to FIG. 2 and as discussed in more detail in U.S. Pat. No. 5,077,870 to Melbye et al., which is incorporated herein by reference, a feed stream 54 of a moldable material, such as a thermoplastic resin, is fed into an extruder 56 from which a heated resin melt is fed through a die 58 to a rotating cylindrical microreplication mold 60. Alternatively, the moldable material melt may be applied to a planar substrate, such as substrate 34. Moldable material 50 flows into mold cavities 48, is pressed into tooling molds 44, 60, and is hardened by cooling and/or curing material 50. Material 50 is applied to surface 46 of substrate 34 until it is at a thickness suitable for the desired replicated article 52. Material 50 may be applied in a uniform sheet to substrate 34, or may be applied in different configurations, so as to have, for instance, ribs or other structures. Alternatively, replicated article 52 may be produced by compression molding, as disclosed in Examples 1–4.

Substantially any moldable material 50 may be used to produce replicated article 52. Preferred moldable materials 50 are thermoplastic resins including polyolefins, such as polypropylene and polyethylene, polyurethane, polyvinyl chloride (PVC), polyesters, and polyamides such as nylon. The thermoplastic resin may also comprise blends, including polyethylene and polypropylene blends, co-polymers such as polypropylene impact co-polymers, multi-layer films, and co-extrusions. Additives such as plasticizers, fillers, pigments, dyes, anti-oxidants, release agents and the like may also be incorporated into moldable material 50.

Replicated article 52 is removed from microreplication master tooling 44 after moldable material 50 has hardened, as shown in FIG. 2, so as to maintain the integrity of the geometric structures. Geometric structures similar to, or mirror images of, the cavities and geometric structures in microreplication master tooling 44 protrude from the surface of replicated article 52. Alternatively, replicated article 52 may be removed from microreplication master tooling prior to complete hardening of moldable material 50 to produce other desired shapes and properties. If desired, the geometric structures in the replicated article may be subjected to post-processing steps to achieve varied configurations, such as bent over hooks, mushroom-type caps, or other shapes.

FIG. 4 illustrates a cross section view of tooling 44 where the geometric structure is an angled tubular shape 65 having side surfaces 67, 69 and bottom surface 71 extending between side surfaces 67, 69. Two or more angled tubular shapes 65 may intersect surface 46 of substrate 34 at different angles α, including angles not feasible or contemplated by any other replication process.

The geometric structures recessed into substrate 34, and those which protrude from each replicated article 52, may include a wide variety of shapes, designs and patterns. Side surfaces of the geometric structures may intersect surface 46 of substrate 34 at varying acute angles determined to be suitable for different end uses of replicated article 52. Since replicated article 52 has essentially identical geometric structures as tooling 44, the geometric structures will be discussed with reference to replicated article 52.

FIG. 3 illustrates a cross section view of master tooling 44 and replicated article 52 having conical or pyramidal geometric structures 62 formed by side surfaces 64, 66. Side surfaces 64, 66 taper inwardly and away from surface 46 into substrate 34. The angle at which side surfaces 64, 66 intersect surface 46 of tooling 44 may vary, depending on the size of pyramidal or conical geometric structure 62 desired.

Figure 5:
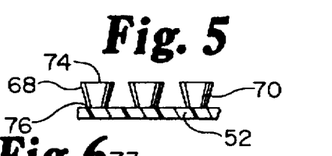
FIG. 5 is a side section view of the replicated article produced from a microreplication tooling having a large truncated cone or tubular suction cup configuration.
Figure 6:
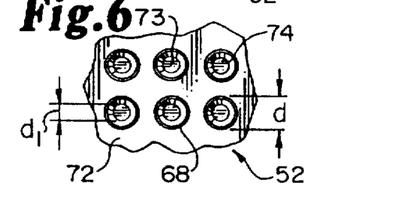
FIG. 6 is a side section view of the replicated article produced from a microreplication tooling having a small truncated cone or tubular suction cup geometric configuration.
Figure 7:
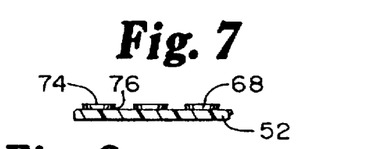
FIG. 7 is a top view of the geometric structures protruding from the replicated article shown in FIG. 5.
Figure 8:
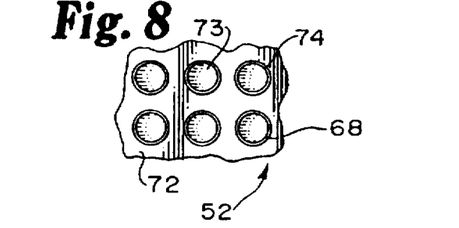
FIG. 8 is a top view of the replicated article shown in FIG. 6.

FIGS. 5 and 6 show a side section view of replicated article 52, and FIGS. 7 and 8 depict a top view of article 52, respectively, in which geometric structure 68 has a suction cup or truncated cone or tubular configuration. As shown in FIGS. 5–8, side surface 70 of suction cup geometric configuration 68 is substantially annular and continuous, and is adjacent bottom surface 73. Side surface 70 may be of varying heights, as illustrated in FIGS. 5 and 6. As side surface 70 of suction cup 68 increases in height, as in FIG. 5, side surface 70 tapers outwardly in a direction away from surface 72 of article 52, such that the diameter d at the top surface 74 of suction cup 68 is larger than the diameter $d_1$ of the base 76 of suction cup 68, as seen in FIG. 7. For smaller suction cups 68, as seen in FIGS. 6 and 8, top surface 74 is approximately the same diameter as base 76, although this may vary. Side surface 70 may include other configurations, such as elliptical, and rectangular.

Figure 9:
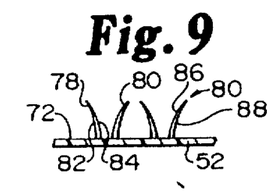
FIG. 9 is a front section view of the replicated article produced from a microreplication tooling having an angled multiple protrusion geometric configuration.
Figure 10:
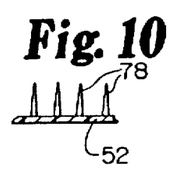
FIG. 10 is a side section view of the replicated article shown in FIG. 9.
Figure 11:
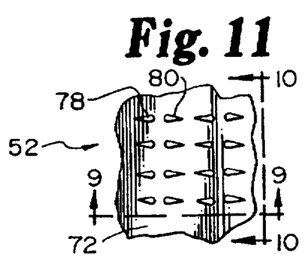
FIG. 11 is a top view of the replicated article shown in FIGS. 9 and 10.
Figure 12:
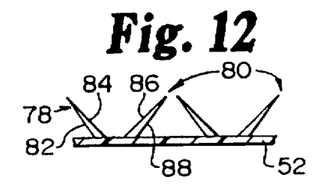
FIG. 12 is a front section view of the replicated article produced from a microreplication tooling having a wide angled/separated multiple protrusion geometric configuration.
Figure 13:
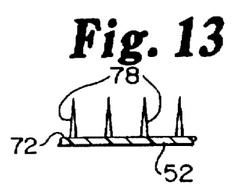
FIG. 13 is a side section view of the replicated article shown in FIG. 12.
Figure 14:
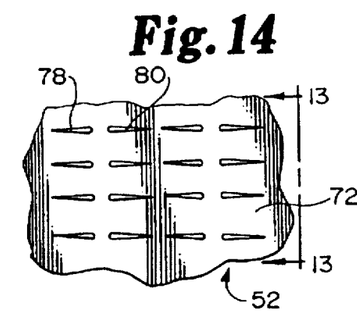
FIG. 14 is a top view of the replicated article shown in FIGS. 12 and 13.

Referring to FIGS. 9–14, a geometric configuration having a plurality or grouping of angled protrusions or pins is illustrated. FIGS. 9 and 12 illustrate a front section view of angled protrusions 78, 80 which extend from replicated article surface 72 at selected, different acute angles, and which may be of varying dimensions. Protrusions 78, 80 include side surfaces 82, 84, 86, 88, as shown in FIGS. 9 and 12. FIGS. 10 and 13 show a side section view of angled protrusion 78 extending from surface 72 of replicated article 52. Referring to FIGS. 11 and 14, a top view of protrusions 78, 80 extending at different angles from surface 72 of replicated article 52 is shown.

Figure 15:
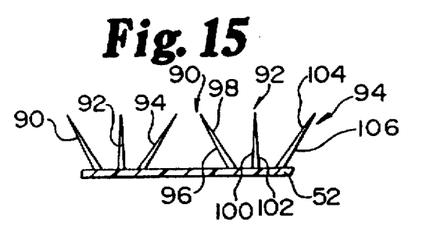
FIG. 15 is a front section view of the replicated article produced from a microreplication tooling having a "crow's feet" arrangement.
Figure 16:
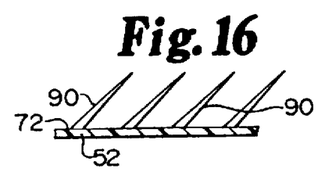
FIG. 16 is a side section view of the replicated article shown in FIG. 15.
Figure 17:
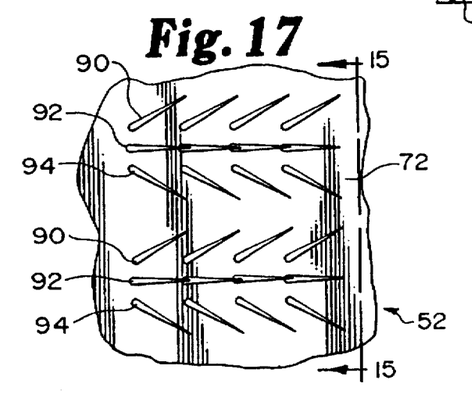
FIG. 17 is a top view of the replicated article shown in FIGS. 15 and 16.

Referring to FIGS. 15–17, a front section view of replicated article 52, a side section view of replicated article 52, and a top view of replicated article 52, respectively, configured in a "crow's feet" arrangement is illustrated. Pins or protrusions 90, 92, 94 extend from surface 72 at selected acute angles to surface 72 of replicated article 52. Protrusions 90, 94 are generally at a selected acute angle relative to surface 72 of replicated article 52. Protrusion 92 extends in a substantially perpendicular orientation to surface 72 of replicated article 52. The dimensions of protrusions 90, 92, 94 may vary, and protrusions 90, 92, 94 may intersect surface 72 of article 52 at varying angles. Each protrusion 90, 92, 94 comprises side surfaces 96, 98, 100, 102, 104, 106.

Figure 18:
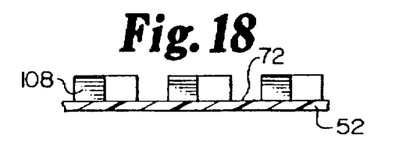
FIG. 18 is a front section view of the article produced from a microreplication tooling having an acute angled chevron configuration.
Figure 19:
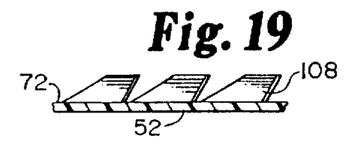
FIG. 19 is a side section view of the replicated article shown in FIG. 18.
Figure 20:
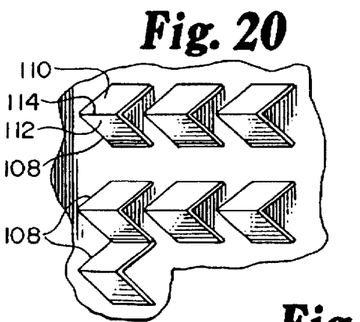
FIG. 20 is a top view of the replicated article of FIGS. 18 and 19 where the chevrons are independent and interconnected.
Figure 21:
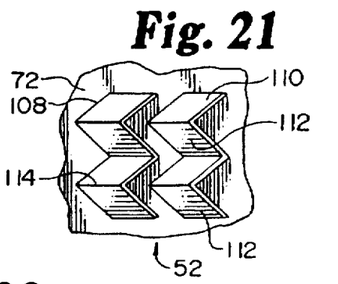
FIG. 21 is a top view of the replicated article where the acute angled chevrons are interconnected.
Figure 22:
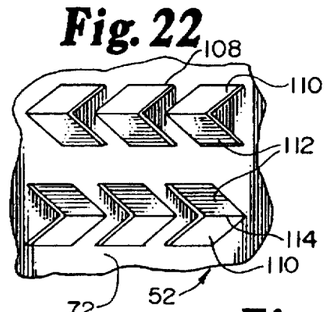
FIG. 22 is a top view of the replicated article where the chevrons are oriented in different directions.
Figure 24:
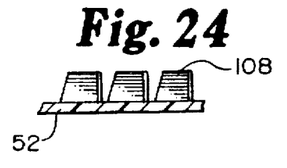
FIG. 24 is a side section view of a replicated article shown in FIG. 23.

FIGS. 18–25 illustrate an article 52 in which the protruding geometric structures have a chevron configuration. FIGS. 18 and 23 show a front view of replicated article 52. FIGS. 19 and 24 illustrate a side section view of article 52. FIGS. 20–22 and 25 illustrate a top view of article 52. Chevrons 108 are formed by the intersection of side surfaces 110, 112 at leading edge 114. Side surfaces 110, 112 intersect surface 72 of article 52 at varying acute angles. Side surfaces 110, 112 of chevrons 108 may be at a selected acute angle to surface 72 of article 52, as seen in FIGS. 18–22, or may be almost perpendicular to surface 72 of article 52, as seen in FIGS. 23–25. As shown in FIGS. 20–22, chevrons 108 may be may be interconnected and independent on the same replicated article 52, may be interconnected, and/or oriented in multiple directions, and of varying dimensions.

Referring to FIG. 26, a side section view of replicated article 52 is shown. FIG. 27 shows a top view of article 52 in which the geometric structure is a single upwardly extending protrusion or pin 116 formed in a row. Pin 116 may be of varying dimensions, and has side surfaces 118, 120 which intersect surface 72 of article 52 at varying acute angles. Alternatively, a single continuous ridge or structure 115 may be produced in replicated article 52, as shown in FIG. 27.

FIG. 28 is a front section view of a replicated article having angled protrusions 122 extending at selected acute angles from surface 72 of article 52. FIG. 29 is a side section view of article 52. FIG. 30 is a top view of article 52. Protrusions 122 include at least side surfaces 124, 126. As illustrated in FIGS. 28–30, protrusions 122 may be of varying dimensions on the same article 52 so as to produce a sculptured surface effect on article 52.

As can be seen in FIGS. 3–30, the varied geometric structures may range from conical to tubular to annular to angular in shape, and may comprise a single or multiple protrusion configuration. In addition, the dimensions of the geometric structures may vary depending on the end use of the replicated article. In addition, any geometric structures produced in tooling 44 or replicated article 52 may be independent from one another, interconnected, in rows, and/or oriented in different or multiple directions. Also, the geometric structure protrusions on replicated article 52 may be uniform in height, or may be at varying heights through out replicated article 52. Many varied geometric patterns and configurations determined by the selected pulse length, power level, pulse space, wavelength, feed rate, gas mixture, cavity pressure, mode, choice of lens, and focus of laser light source 32 are within the contemplation of this invention.

Articles replicated from microreplication master tooling 44 may be used in a wide variety of applications. For instance, the replicate or article 52 may be used as a mechanical fastener for use in the disposable soft goods industry. In addition, a pressure sensitive adhesive may be applied to surface 72 of replicated article 52 to create a mechanical-adhesive fastener, as shown in U.S. Pat. No. 4,959,265 to Wood, for the disposable soft goods industry, such as disposable diapers, adult incontinence products, and feminine hygiene products.

In operation, substrate 34 is positioned on table 36. The desired pulse length, power level, pulse spacing, lens system, mode, wavelength, cavity pressure, feed rate, gas mixture, and focus for laser light source 32 are selected and preferably programmed into control means 40. Laser light from laser light source 32 is then emitted. Control means 38 positions substrate 34 under laser light source 32, moving substrate 34 into different positions and orientations with respect to laser light source 32. Patterns of desired geometric structures are machined into substrate 34 using laser energy. Depending on the use of microreplication master tooling 44, the entire surface 46 of substrate 34 may be machined by laser light or only selected areas of substrate 34 may be machined.

After fabrication of microreplication master tooling 44, moldable material 50 is applied to surface 46 of tooling 44. Moldable material 50 covers the surface 46 of master replication tooling 44, and flows into cavities 48 in tooling 44 and around the geometric structures contained within cavities 48. After moldable material 50 hardens or solidifies to the desired degree, replicated article 52 is removed from contact with microreplication master tooling 44. If cylindrical mold 60 is used, replicated article 52 may be continually removed from mold 60. Post processing of replicated article 52 may be done to produce a variety of shaped hook, mushroom, or the like configurations. The replicated articles produced may also be used to produce additional, multi-generational replicated articles.

EXAMPLES 1–3

A substrate comprising an approximate 45 mil thermoset polysiloxane rubber conforming to ASTM D-2000 Classification FC, FE, GE and a ¼ inch thick number 304 steel plate was obtained from Industrial Molded Rubber, Inc. After grinding the polysiloxane layer down to an approximate 30 mil. caliper, the siloxane surface was exposed to an 80 watt $CO_2$ laser to produce three separate 2 inch by 4 inch machined areas with 10,000 holes per square inch under the conditions indicated in Table I. The laser focus was set to machine the smallest entrance hole going into the siloxane rubber surface. In Example 1, the laser machined the substrate at the rate of about 140 cavities per second. In Examples 2 and 3, the laser machined the substrate at a rate of about 240 cavities per second.

TABLE I

| EXAMPLE | FEED RATE (in/min) | PULSE LENGTH (msec) | SPACING (mils) | CAVITY PRESSURE (mbar) | MEASURED POWER (W) | TOOLING TIME (sec) |
|---|---|---|---|---|---|---|
| 1* | 100 | 1.0 | 9.5 | 15 | 47 | 569.6 |
| 2 | 200 | 0.1 | 9.5 | 15 | 43 | 332.2 |
| 3 | 200 | 0.1 | 9.5 | 15 | 31 | 332.2 |

*Note: Example 1 was machined through to steel plate.

The tool in each of Examples 1-3 was replicated with a polypropylene impact co-polymer resin (Shell Chemical 7C50) via compression molding in a Tetrahedron Associates, Inc. MTP programmable platen press using the program conditions set forth in Table II.

TABLE II

| STEP | TEMP (°F.) | TEMP RATE (°F./Min.) | RAM FORCE Klbs. | FORCE RATE Klbs./min. | DWELL TEMP (°F.) | DWELL TIME (sec) |
|---|---|---|---|---|---|---|
| 1 | 350 | 200 | 0.4 | 50 | OFF | 60 |
| 2 | 350 | 200 | 25 | 200 | OFF | 60 |

TABLE II-continued

| STEP | TEMP (°F.) | TEMP RATE (°F./Min.) | RAM FORCE Klbs. | FORCE RATE Klbs./min. | DWELL TEMP (°F.) | DWELL TIME (sec) |
|---|---|---|---|---|---|---|
| 3 | 145 | 200 | 25 | 200 | OEF | 15 |
| 4 | END | | | | | |

Upon completion of the cycle, the quenched replicated article was stripped from the plate and cross-sectioned for profile measurement using scanning electron microscopy (SEM) to determine the shape and the dimensions of the machined holes, as reported in Table III.

TABLE III

| EXAMPLE | HEIGHT (microns) | BASE (microns) | TIP (microns) | SHAPE |
|---|---|---|---|---|
| 1 | 773 | 190 | 102 | tubular |
| 2 | 182 | 159 | 23 | conical |
| 3 | 140 | 123 | 21 | conical |

EXAMPLE 4

A 160 mil substrate was made from silicone conforming to ASTM D-2000 Classification FC, FE, GE. The silicone surface was exposed to a 250 watt $CO_2$ laser (82% He, 13.5% $N_2$, 4.5% $CO_2$) under the conditions set forth in Table IV.

TABLE IV

| EXAMPLE | LENS FOCAL LENGTH (in) | STAND-OFF | POWER (W) | FEED RATE (in/min.) | PULSE LENGTH (m. sec.) | CAVITY PRESSURE (torr) | SPACING (mil.) |
|---|---|---|---|---|---|---|---|
| 4 | 3.75 | 0 | 250 | 160 | 0.3 | 19 | 25 |
| 5 | 3.75 | 0 | 260 | 150 | 0.3 | 18 | 35 |

A mirror image replicate was made of the master tool by pressing three sheets of 5 mil. thick film of Shell Chemical WRS 6-166 polypropylene random co-polymer resin in an MTP programmable platen press as in Examples 1-3 under the conditions set forth in Table V having the dimensions and properties set forth in Table VI.

TABLE V

|        | TEMP (°F.) | TEMP RATE (°F.)/Min. | MOLDING PRESSURE psi | FORCE RATE Klbs./min. | DWELL TEMP (°F.) | DWELL TIME (sec) |
|--------|------------|----------------------|----------------------|------------------------|-------------------|-------------------|
| STEP 1 | 350° F.    | 200                  | 3 psi                | 50                     | OFF               | 60                |
| STEP 2 | 350° F.    | 200                  | 200 psi              | 200                    | OFF               | 60                |
| STEP 3 | 145° F.    | 200                  | 200 psi              | 200                    | OFF               | 15                |
| STEP 4 | END        |                      |                      |                        |                   |                   |

TABLE VI

| EXAMPLE | HEIGHT (mil) | BASE WIDTH (mil) | DENSITY (pins/in²) | SHAPE   |
|---------|--------------|------------------|---------------------|---------|
| 4       | 64.3         | 8.2              | 1600                | Tubular |
| 5       | 20           | 7.5              | 816                 | Tubular |

EXAMPLE 5

A silicone tool substrate was exposed to a 260 watt $CO_2$ laser under the conditions set forth in Table IV. A mirror image replicated article was made of the master tool by extruding an impact polypropylene resin (Shell Chemical SRD7-463) onto the mold at a delivery temperature of 550° F. The resin was pressed into the mold using a roller pressure of 186 pli. Physical dimensions and properties of the protrusions are reported in Table VI.

There are several advantages to using the laser machined microreplication tooling of the present invention. First, laser energy can efficiently machine patterns into substrate 34 at a high speed to produce a high feature density pattern. In addition, since a one piece substrate is utilized, piecing together of numerous intermediate molds to produce the final mold is not required. Due to the high speed machining directly onto the one-piece substrate, without intermediate molds being required, significant savings in time and cost result.

Use of a preferably deformable, flexible substrate, such as a silicone rubber, is also advantageous. First, silicone rubbers are readily available at a reasonable cost. Second, silicone rubber molds or toolings are deformable, which minimizes the shear, and reduces the breakage of the geometric structures as replicated article 52 is removed from microreplication tooling 44. In addition, silicone rubbers are durable and are resistant to degradation. The low energy surface of a silicone rubber mold permits easy release of the replicated article from the mold or substrate. Since the silicone mold is deformable, the laser light may do further undercutting of the mold substrate than is done with conventional methods and still have the ability to easily remove the replicated article from the mold. Laser energy is received well by silicone rubber substrates. Vaporization of the silicone rubber by laser light removes the material from the machined cavity, producing a minimum flash residue, which is easily cleaned and removed.

Laser machining of the microreplication tooling is advantageous in that the molds may be produced at a high speed at a significantly reduced cost. In addition, pattern flexibility is achieved since a wide variety of geometric structures may be machined into the microreplication tooling. Further, using a laser to machine the silicone tooling provides profile flexibility in the geometric structures. In addition, entrance holes in the molding substrate which are approximately eight (8) mils in diameter with aspect ratios of approximately 8:1 have been achieved. Smaller, highly detailed shaped structures may be obtained that are not possible with current machining technologies.

What is claimed is:

1. A method of manufacturing a mechanical fastener from a replication master tooling article, comprising the steps of:
   providing a flexible, thermoset polymeric tooling substrate having a low energy first surface;
   machining to remove material from the first surface of the tooling substrate with a laser light source to produce at least one geometric structure having at least one side surface extending from the first surface of the substrate into the substrate, thereby yielding a replication master tooling article for manufacturing a mechanical fastener;
   applying a moldable material to the first surface and geometric structures of the replication master tooling article;
   at least partially solidifying the moldable material to produce a mechanical fastener; and
   removing the mechanical fastener from contact with the replication master tooling article.

2. The method of claim 1 wherein the substrate first surface is machined so that a plurality of the side surfaces intersect the substrate first surface at acute angles.

3. The method of claim 2 wherein the geometric structure side surfaces form a group of angled tubular structures.

4. The method of claim 2 wherein the geometric structure side surfaces are substantially conical.

5. The method of claim 2 wherein the geometric structure side surfaces are substantially pyramidal.

6. The method of claim 2 wherein the geometric structures are a chevron configuration.

7. The method of claim 1 wherein the machining produces geometric structures in which each structure comprises a bottom surface extending between the side surfaces.

8. The method of claim 7 wherein the geometric structures comprise truncated cones.

9. The method of claim 1 wherein the substrate is integral.

10. The method of claim 1 wherein the substrate material is cross linked silicone rubber.

11. The method of claim 1 wherein the moldable material comprises a multi-layer film.

12. The method of claim 1 wherein the moldable material is a thermoplastic resin selected from the group consisting of polypropylene, polyethylene, polyester, polyurethane, polyvinyl chloride, nylon and blends thereof.

13. The method of claim 1 wherein said machining comprises forming an array of geometric structures which are uniform in height.

14. The method of claim 1 wherein said machining comprises forming an array of geometric structures which are of differing heights.

15. The method of claim 1 wherein the at least one geometric structure has an aspect ratio comprising approximately 8:1.

16. The method of claim 1 wherein the at least one geometric structure comprises approximately 10,000 geometric structures per square inch.

17. The method of claim 1 wherein the step of machining the first surface of the substrate with a laser light to produce at least one geometric structure comprises machining about 140 geometric structures per minute.

18. The method of claim 1 wherein the at least one geometric structure comprises at least one geometric structure having an undercut.

19. The method of claim 1 wherein the multi-layer film comprises a co-extrusion having at least one layer of a thermoset material.

* * * * *

UNITED STATES PATENT AND TRADEMARK OFFICE
CERTIFICATE OF CORRECTION

PATENT NO. : 5,792,411
DATED : August 11, 1998
INVENTOR(S) : Terry L. Morris, Eagan; Herbert J. Fox, Maplewood; Thomas P. Hanschen, St. Paul; Philip Miller, Eagan, all of Minn.

It is certified that error appears in the above-identified patent and that said Letters Patent is hereby corrected as shown below:

In Column 14, line 4 "claim 1" should be -- claim 11 --

Signed and Sealed this

Twelfth Day of January, 1999

Attest:

*Attesting Officer*        Acting Commissioner of Patents and Trademarks